(12) United States Patent
Curlier et al.

(10) Patent No.: US 9,518,687 B2
(45) Date of Patent: Dec. 13, 2016

(54) DEVICE FOR THE BLIND COUPLING OF FLUIDIC, ELECTRICAL OR SIMILAR SUPPLIES, TO A RECEIVING CONTROL MECHANISM

(71) Applicant: SNECMA, Paris (FR)

(72) Inventors: Augustin Curlier, Melun (FR); Gilles Alain Charier, La Grande Paroisse (FR); Olivier Belmonte, Perthes en Gatinais (FR)

(73) Assignee: SNECMA, Paris (FR)

( * ) Notice: Subject to any disclaimer, the term of this patent is extended or adjusted under 35 U.S.C. 154(b) by 726 days.

(21) Appl. No.: 13/940,772

(22) Filed: Jul. 12, 2013

(65) Prior Publication Data

US 2014/0023505 A1   Jan. 23, 2014

(30) Foreign Application Priority Data

Jul. 18, 2012   (FR) ..................................... 12 56923

(51) Int. Cl.
*B64C 11/38* (2006.01)
*F16L 21/00* (2006.01)
*F01D 7/02* (2006.01)

(52) U.S. Cl.
CPC .............. *F16L 21/00* (2013.01); *B64C 11/385* (2013.01); *F01D 7/02* (2013.01); *Y02T 50/66* (2013.01)

(58) Field of Classification Search
CPC ............... F16L 21/00; F01D 7/00; F01D 7/02; B64C 11/30; B64C 11/38; B64C 11/385; B64C 11/40; B64C 11/42; B64C 11/44; Y02T 50/66

USPC ..................................... 416/155, 156, 157 R
See application file for complete search history.

(56) References Cited

U.S. PATENT DOCUMENTS

| | | | | |
|---|---|---|---|---|
| 2,332,452 A | * | 10/1943 | Martin | B64C 11/42 416/47 |
| 2,934,154 A | * | 4/1960 | Chilman | B64C 11/385 416/154 |
| 3,212,586 A | * | 10/1965 | Barnes | B63H 3/082 416/46 |
| 3,219,121 A | * | 11/1965 | Barden | B64C 11/385 416/154 |
| 4,563,940 A | * | 1/1986 | Wuhrer | B63H 3/08 277/500 |

(Continued)

FOREIGN PATENT DOCUMENTS

| | | |
|---|---|---|
| FR | 2 607 464 | 6/1988 |
| GB | 556820 | 10/1943 |

OTHER PUBLICATIONS

French Preliminary Search Report and Written Opinion issued Apr. 12, 2013, in French 1256923, filed Jul. 18, 2012 (with English Translation of Categories of Documents).

*Primary Examiner* — Ninh H Nguyen
*Assistant Examiner* — Aaron R Eastman
(74) *Attorney, Agent, or Firm* — Oblon, McClelland, Maier & Neustadt, L.L.P.

(57) ABSTRACT

A device can be housed coaxially inside a sleeve in which the supplies are situated, and includes: a hollow cylindrical body that fits inside the sleeve and accepts the mechanism in the housing of the hollow body, with passages for respectively connecting the supplies to said mechanism; and a cover which is integrated or fixed, removably, on the front side of the cylindrical body and connects the hidden supplies to the respective passages of the body.

12 Claims, 4 Drawing Sheets

(56) References Cited

U.S. PATENT DOCUMENTS 4,750,862 A * 6/1988 Barnes .................... B64C 11/30
  416/157 R
6,077,040 A * 6/2000 Pruden .................... B24C 11/00
  416/153

* cited by examiner

DEVICE FOR THE BLIND COUPLING OF FLUIDIC, ELECTRICAL OR SIMILAR SUPPLIES, TO A RECEIVING CONTROL MECHANISM

BACKGROUND OF THE INVENTION

The present invention relates to a device for the blind coupling of supplies derived from generators or sources of fluidic, electrical or similar power, and which pass along inside a shaft or cylindrical sleeve which is static, to a receiving control mechanism such as, in the preferred application of the invention, a mechanism for controlling a system that controls the pitch of a turbomachine fan. The invention also relates to a fluidic assembly comprising a receiving control mechanism and a coupling device, and to a system for controlling the pitch of the blades of a turbomachine fan that comprises such a fluidic assembly.

More specifically, although not exclusively, the device is intended to be mounted in turbine engines with pairs of contra-rotating propulsion fans, known by their English name of "open rotor" or "unducted fan" engines. However, without departing from the scope of the invention, it could also be mounted on a turboprop that has a propeller for propulsion.

It is known that a turbine engine of the open rotor type mainly comprises, along a longitudinal axis and inside a fixed cylindrical nacelle borne by the structure of the aircraft (such as the rear part of an airplane fuselage), a "gas generator" part and a "propulsion" part. The latter part comprises two, coaxial and contra-rotating, fans, these respectively being the upstream (forward) and downstream (rear) fans which are driven, in opposite directions of rotation from one another, for example, by a suitable mechanical means driven by a power turbine situated at the exit of the gas generator part and the fan blades of which run substantially radially outside the nacelle.

To allow the turbine engine to operate optimally in the various phases of flight encountered, the contra-rotating fan blades are able to rotate about their respective pivot axes via a suitable pitch control system that allows the pitch of the blades to be varied during flight and on the ground, i.e., that alters the pitch of the fan blades. The blades may vary according to the system, from +90° to 30° for phases of flight, from +30° to −30° for phases on the ground and in reverse, and may have a rapid return to 90°, in the feathered position, in the event of in-flight malfunction (engine failure), when the blades are moved into a non-obstructing position relative to the direction of forward travel of the airplane and offer the least possible amount of drag. The "angular excursion" of the blades between the featured position and reverse position is thus of the order of 120°.

DESCRIPTION OF THE PRIOR ART

Numerous systems for orientating fan blades have already been proposed and comprise a fluidic control mechanism based on a linear actuator, which is provided with a system for transferring oil from the fixed frame of reference of a sleeve in this instance and from the piping, secured to the engine casing, to the rotary frame of reference of the actuator, secured to the rotor, and a transmission mechanism between the linear actuator and the blade roots, to convert the translational movement of the actuator, imposed by the control mechanism, into a rotation of the blades by the transmission mechanism.

The control mechanism of this system therefore comprises internal chambers and/or passages for the hydraulic fluid, these being specific to the various phases of operation recalled hereinabove and connected to the actuator for moving the mobile part thereof. This hydraulic network is supplied by various oil ducts (three in all) under pressure that control the pitch-control actuator in all the various flight situations of the aircraft recalled hereinabove (fine pitch in flight, decreasing to 30°, fine pitch on the ground and in reverse, decreasing to −30° from 30°, and rapid return to the feathered position at 90° whatever the starting position).

Added to these fluidic passages are electrical connections for sensors intended notably to measure the rotational speed of the fan rotor to which the linear actuator is secured, and the displacement of the actuator.

Supplies of the fluidic (hydraulic) and electrical type are therefore provided to operate the pitch control system, and these are situated and fixed in the cylindrical sleeve housed coaxially in the rotary shaft of the turbine engine to the end of which the rotary casing of the downstream fan is connected.

Given the complex and relatively restricted and confined environment, it is not easy to integrate the various connections between the hidden internal supplies and the actuator hydraulic control mechanism distant therefrom. Admittedly, connections could be achieved by simple piping and cables between the various supplies inside the sleeve and the mechanism, but that proves to be complicated and tricky because of the difficult access and the reduced space, and therefore requires lengthy intervention times.

SUMMARY OF THE INVENTION

The present invention aims to overcomes these disadvantages and relates to a device for the blind coupling of fluidic, electrical or similar supplies, to a receiving control mechanism such as an actuator-based control mechanism for a pitch control system for a turbomachine fan, said supplies being situated inside a cylindrical sleeve, and said mechanism outside the sleeve along the axis thereof.

The device is notable in that it is able to be housed coaxially inside the sleeve and comprises:
- a hollow cylindrical body designed to fit inside the sleeve and accept the mechanism in the housing of the hollow body, and having passages for respectively connecting the supplies to the control mechanism;
- a cover which is integrated or fixed, removably, on the front side of the cylindrical body and designed to connect the hidden supplies to the respective passages of the body; and
- a ring for collecting and distributing provided on the rear side of the body, around the latter, and designed to connect the respective passages of the body to the control mechanism and to position the body, in axial abutment and in terms of rotation, relative to the sleeve, guaranteeing coupling between the supplies and the cover.

Thus, by virtue of the invention, once the fluidic couplings and electrical connections have been made between the external ring and the control mechanism, the coupling device is introduced into the sleeve via a translational movement until it comes axially into abutment therein, in the desired orientation, thereby simultaneously, and blind, making the couplings and connections by the cover with the supplies (both fluidic and electrical) hidden inside the sleeve. It is therefore possible to be sure that the couplings and connections have been correctly made with the supplies.

The device therefore acts as an interface for the blind coupling of the hidden supplies secured to the sleeve with the fluidic control mechanism of the pitch control system, by allowing coupling to an array of auxiliaries which is housed inside a confined space.

In addition, it will be noted that, because the device is in the form of a hollow cylindrical body, in which the mechanism is advantageously partially housed, it is of small axial bulk and its use also makes it possible to reduce the diameter of the sleeve needed for installing the hydraulic and electrical auxiliaries. Thus, once the body, the cover and the ring have been fitted, the device is of compact cylindrical shape, easy to assemble with the mechanism and then to fit into/remove from the sleeve by simply sliding it, while at the same time guaranteeing coupling to the supplies. Once integrated into the sleeve, the device moreover frees up the space that a conventional network using piping and electrical connections by connectors would occupy where it installed. Ultimately, the reliability of the various hydraulic couplings and electrical connections is guaranteed.

For example, the cylindrical body comprises at least two internal lateral passages formed in the lateral wall of the hollow body and opening respectively, at the front of the body, into distinct cavities in communication with couplings of the cover, and at the rear, into radial communication orifices of the body facing and in communication with couplings of the ring.

In the above application, the two passages are used for the hydraulic supply to the mechanism for rotating the downstream fan blades in the two directions.

Advantageously, in addition to the lateral passages, the cylindrical body comprises an axial passage formed in a transverse wall of the body and opening, at the front, into a coupling of the cover and receiving, at the rear, inside the housing, a tubular element for connection to the control mechanism. This third passage is used for putting the fan blades in the feathered position.

As far as the cover which is integrated or fixed transversely on the front of the cylindrical body is concerned, this may comprise fluidic couplings and at least one electrical or similar connector, all of them parallel to the body, able to engage coaxially with sealing and respectively with complementary receiving couplings and a complementary receiving connector which terminate the supplies secured to the sleeve.

In the application of the invention, the cover comprises three fluidic couplings, one central one and two peripheral ones (for the three phase of operation of the mechanism for controlling the pitch of the blades), and one electrical connector, said couplings and connector, which are all mutually parallel, being able respectively, through axial sliding of the device, to collaborate with complementary receiving couplings and a connector that terminate the supplies secured to the sleeve.

Moreover, the cover is fixed by screwing to the body by a clamping nut mounted around this body. The cover thus ensures the complete blind coupling (both fluidic and electrical) to the supplies (auxiliaries) coming from the sleeve.

Finally, as far as the external ring is concerned, it comprises distinct internal cavities in connection with the passages of the body via holes made in the internal lateral wall of the ring, and with the external fluidic couplings with which complementary couplings originating from the control mechanism can engage. This ring thus collects the oil coming from the passages of the body to convey it to the control mechanism.

Advantageously, the external ring is mounted in axial abutment on the cylindrical body and is fixed thereto by a clamping nut, at the opposite end from the stop, and a rotational-connection and error-proofing means is provided between the ring and the body to immobilize these in terms of rotation in a unique position for which the cavities of the ring communicate with the respective passages of the body.

In addition, the external ring is likewise mounted in axial abutment inside the sleeve, after introduction of the device, by a rotational-connection and error-proofing means provided between the ring and the sleeve to immobilize these two elements in terms of rotation in a unique position.

Thus, using these connecting means, it is possible to be sure that the device of the invention is correctly positioned both rotationally and axially in relation to the sleeve, guaranteeing the couplings and connections with the supplies.

Furthermore, a clamping piece is mounted around the receiving control mechanism, said piece being designed to press against the free end of the sleeve and, when it is in the engaged axial position, keep the device coupled to the various supplies and to the control mechanism.

The invention also relates to a fluidic assembly for connection between fluidic, electrical or similar supplies situated inside a cylindrical sleeve and a receiving system, such as a system for controlling the pitch of the blades of a turbomachine fan. Advantageously, said assembly comprises a receiver control mechanism connected to the system and a coupling device as defined previously for coupling the supplies and the mechanism.

For example, the coupling device and the control mechanism may be made as one piece.

The invention also relates to a system for controlling the pitch of the blades of a turbomachine fan, comprising a receiving control mechanism based on an actuator, a transmission mechanism for transmitting movement between the actuator and the blades, fluidic, electrical or similar supplies situated inside a cylindrical sleeve, and a device for the blind coupling of said supplies to said receiving control mechanism. Said device is as defined hereinabove.

BRIEF DESCRIPTION OF THE DRAWINGS

The figures of the attached drawing will make it easy to understand how the invention may be embodied.

DESCRIPTION OF THE PREFERRED EMBODIMENTS

Figure 1:
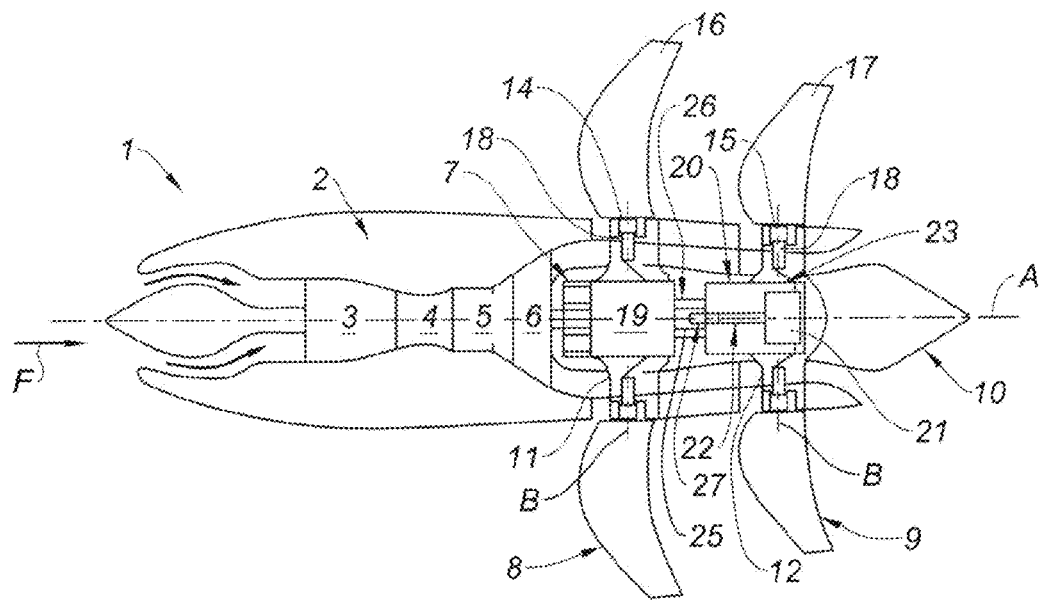
FIG. 1 is a schematic view in axial section of a turbine engine with a pair of contra-rotating fans, one upstream and one downstream, incorporating, at least in the case of the downstream fan, a system for controlling the pitch of the blades with, according to the invention, the device for coupling the system to the fluidic and electrical supplies.

As FIG. 1 schematically shows, the unducted fan ("open rotor") turbine engine 1, of longitudinal axis A, comprises in the usual way, from upstream to downstream in the direction of flow of the gaseous stream F inside a nacelle 2 of the turbine engine, one or two compressors 3 depending on the architecture of the gas generator, whether this be a single spool or a double spool design, an annular combustion chamber 4, a high-pressure turbine or two turbines, one high pressure and one intermediate pressure 5 depending on said architecture, and a low-pressure turbine 6 which, via reduction gear or an epicyclic gearbox 7 drives, in contra-rotatory fashion, two fans, one upstream 8 and one downstream 9 in the direction of the stream F, these fans being aligned coaxially along the longitudinal axis A of the turbine engine to form the fan unit. A jet pipe 10 terminates the turbine engine in the usual way.

The fans are arranged in parallel radial planes, perpendicular to the axis A, and rotate via the turbine 6 and the reduction gear 7 in opposite directions of rotation. They are mounted in rotary casings 11, 12 with polygonal collar around which the roots 14, 15 of the blades 16, 17 are mounted.

Moreover, the blades of the upstream fan 8 and downstream fan 9 are of the variable-pitch type, which means that they can be oriented about their respective radial pivot axes B using a controllable system that controls the pitch of the blades, so that these blades adopt a desired optimum angular position dependent on the operating conditions of the turbine engine and on the phases of flight concerned, as recalled hereinabove. In the present description, only the pitch control system 20 associated with the downstream fan 9 will be described. The upstream fan 8 may be equipped with a pitch control system 19 analogous to the one developed hereinafter in conjunction with the downstream fan.

The pitch control system 20 schematically illustrated in FIG. 1 makes it possible to achieve the various functional phases of the downstream fan as recalled hereinabove (rotating the blades in both directions with increasing and decreasing fan angles, and return of the blades to the feathered position in the event of malfunction).

To do that, it comprises a linear displacement hydraulic actuator 21, centered on the axis A and secured in terms of rotation to the rotary casing 11 of the fan 9. Upstream of the actuator there is a hydraulic control mechanism 22 connected to distinct supplies AL (FIGS. 8, 9) corresponding to the three functional phases described hereinabove, and in communication with the actuator for the translational displacement thereof according to the supply chosen. Further, downstream of the actuator 21, the system 20 comprises a transmission mechanism 23 connecting the mobile part (or body) 24 of the actuator to the radial shafts 18 of the roots 15 of the blades 17 of the fan 9.

The translational movement of the actuator 21 as commanded by the hydraulic mechanism 22 and the chosen supply causes, via the transmission mechanism 23 (link rods, etc.), the radial shafts 18 to turn and therefore alters the pitch (pitch control) of the blades of the downstream fan 9.

Figure 2:
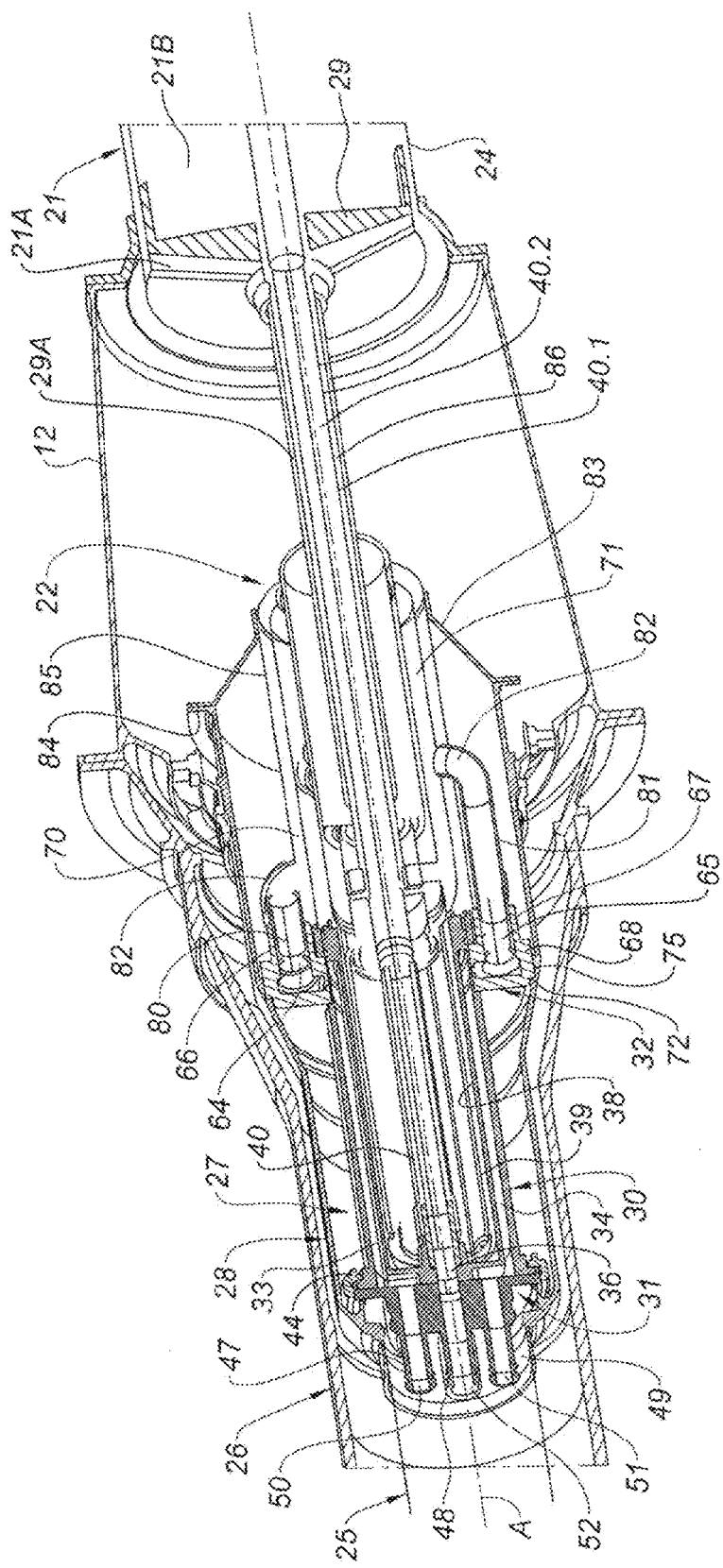
FIG. 2 is a sectioned perspective view of one embodiment of the coupling device mounted blind in a sleeve of the turbine engine and establishing the connections between the supplies in the sleeve and the receiving mechanism of the pitch control system for the downstream fan.

Hence, the hydraulic mechanism 22 of the system 20 has to be coupled to the various supplies AL derived from upstream pumps (sources of power), not visible, and running along inside a static cylindrical sleeve 25 which is internal to and coaxial with the driveshaft 26 of the rotary casing (rotor) 12 of the downstream fan 9, as FIGS. 1 and 2 show.

In addition to the hydraulic supplies AL, the control mechanism needs to be coupled to electrical supplies or connections ALE (FIG. 9) coming from the sleeve and ending at sensors or the like for measuring the rotational speed of the rotor, the translational displacement of the actuator, etc.

All of these hydraulic and electrical supplies located fixedly inside the sleeve 25 have to be connected to the mechanism 22 via the device 27 of the invention. The purpose of this device is to achieve direct and blind coupling of the various supplies to the control mechanism 22 on which the device 27 is already mounted, simply by sliding the latter inside a cylindrical support shroud 28 that terminates the sleeve 25 and in which the hydraulic and electrical supplies which are fixed relative to the shroud terminate.

The support shroud 28 is integrated onto the end of the sleeve 25 using a fixing nut, not depicted; in addition, the surface of the supporting shroud 28 that is situated at the axial position above the hydraulic couplings is dedicated, in this particular instance, to the fitment of a roller bearing used to guide the sleeve relative to the rotor shaft 26 and contributing to the dynamic stability of the sleeve.

As FIG. 2 shows, blind coupling between the control mechanism 22 of the system 20 and the hidden supplies (and other auxiliaries for electronic signals in particular) in the shroud 28 is therefore performed using the device 27 of the invention.

In structural terms, the device 27 comprises, in the embodiment described, three essential components, namely a cylindrical body 30, a cover 31 and a ring 32, the latter two being respectively fixed on the front side and on the rear side of the body.

The device 27 thus assembled then mounted at the end of the control mechanism is housed coaxially by sliding, along the axis A, in the sleeve inside the support shroud until the coupling with the relevant fluidic and electrical supplies is achieved.

Figure 3:
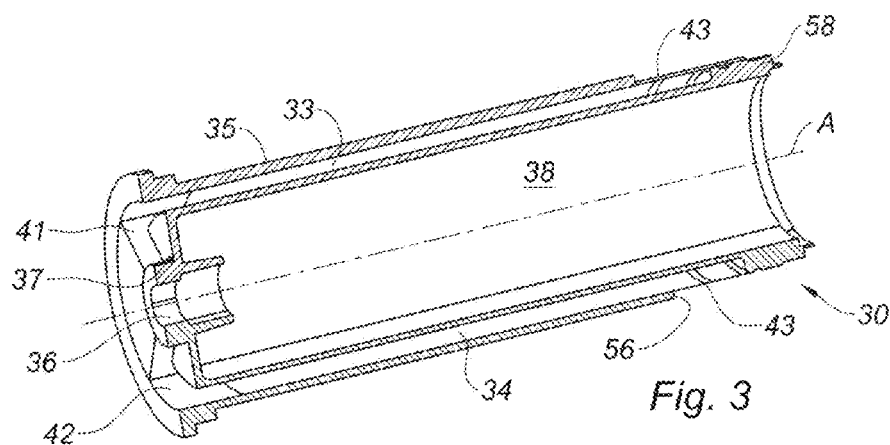
FIG. 3 shows, in sectioned perspective, the cylindrical body of the coupling device.
Figure 4:
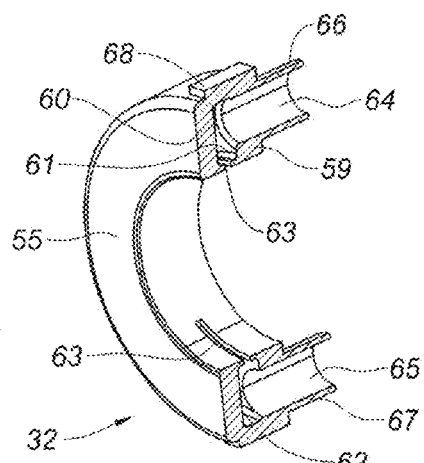
FIG. 4 shows, in sectioned perspective, the external ring of the device, facing toward the pitch control system.

With reference to FIGS. 2 and 3, the cylindrical body 30 is hollow with an axial internal housing 38 and in the above application to the control of the blades of the downstream fan using three distinct hydraulic supplies, comprises three internal parallel passages. Two passages 33, 34 are formed in the lateral wall 35 of the body, almost diametrically opposite one another, and the third passage 36 is in the forward transverse wall 37 of the body, at the center thereof, along the axis A. Naturally, it is possible to increase the number of passages or cavities in order to supply more chambers, or to segment the oil inlets in order to reduce the diameter of the couplings and piping, for example.

Opposite the transverse wall 37, the hollow body 30 is open to the rear so that it can house, with sealing, inside its internal housing 38, the forward cylindrical part 39 (FIG. 2) of the control mechanism 22 in which the tube or tubular element 40 with internal passage is provided for making the connection between the corresponding supply of the sleeve and the actuator, in order to control the return of the fan blades to the feathered position.

In particular, each lateral passage 33, 34 of the cylindrical body 30 opens into a cavity or chamber 41, 42 formed in the front transverse wall 37 of the body and intended to be placed in communication with the cover 31, whereas holes or orifices 43 are provided in the lateral wall 35, near the other open transverse end of the body, to be in communication with the ring 32, as will be seen later.

Figure 7:
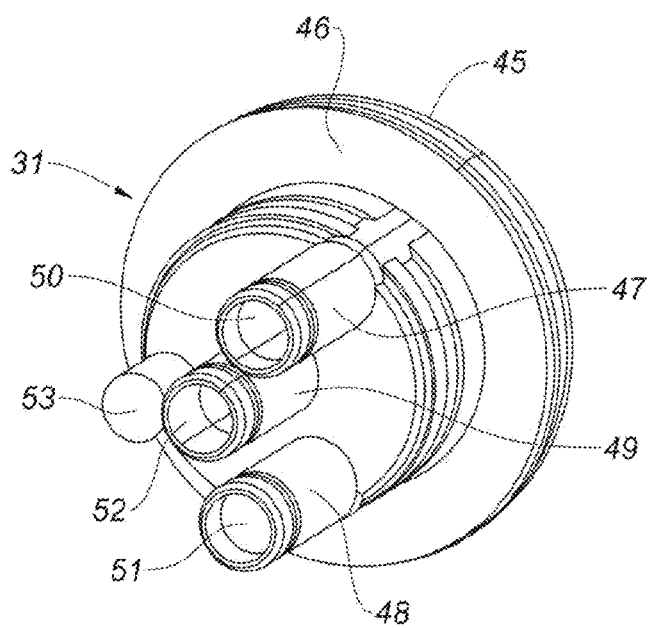
FIG. 7 is a perspective view of the cover of the device with its connections to the internal supplies of the sleeve.

Regarding the cover 31 of the device 27 shown in FIGS. 2 and 7, this is attached to the transverse wall 37 of the body 30 and is secured thereto via a clamping nut 44 provided around the lateral wall of the body and which screws onto a screw thread 45 at the periphery of the cover. Thus, the transverse wall 46 of the cover is pressed with sealing against the front transverse wall 37 of the body by the tightening of the external nut 44. As an alternative, the cover could be integrated or incorporated directly on the cylindrical body.

As can be seen in these FIGS. 2 and 7, the cover 31 comprises three cylindrical end fittings or couplings 47, 48, 49 which are mutually parallel along the axis A. These three couplings define distinct axial through-passages 50, 51, 52 which, once the cover 31 has been screwed onto the body 30, face the cavities 41, 42 of the body in connection with the respective lateral passages 33, 34 of the lateral wall 35, and the central passage 36 of the transverse wall 37. At the opposite end, the couplings engage in fixed complementary respective couplings, visible schematically in FIG. 8, and which terminate the respective hydraulic supplies AL. These run along inside the sleeve, being attached thereto and are derived from (a) specific pump(s) of the turbine engine 1.

Figure 9:
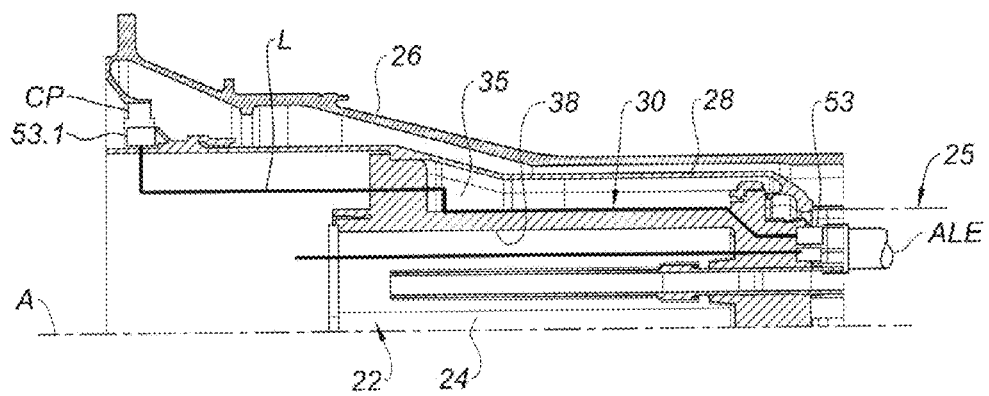

The cover 31 seals the oil cavities 41, 42 of the cylindrical body 30 and provides, in addition to the hydraulic connections to the supplies of the same type, the electrical connections with the corresponding supplies. To do so, as can be seen in FIG. 7, the cover is provided with an electrical end fitting or connector 53, symbolized here and which can be coupled to a complementary connector that terminates the relevant electrical supply ALE (FIG. 9).

Data relating to the measured rotational speed of the rotor and to the linear displacement of the actuator as delivered by specific sensors CP (FIG. 9) can pass through this same connector 53. Thus, this connector carries a number of items of information derived from various sensors and occupies only a small amount of space on the cover. If several separate electrical and/or optical supplies are present in the sleeve, the cover may have a corresponding number of end fittings or connectors.

It should be noted that once the device 27 has been assembled and then connected to the control mechanism 22 by introducing it into the housing, the cover 31 and the cylindrical body 30 are housed in the shroud 28 more or less reproducing the internal profile thereof, without being directly supported thereby. To achieve that, in the embodiment illustrated, the device is centered and positioned angularly and axially with respect to the shroud 28 by the external ring 32 borne by the shroud and described hereinafter.

As FIGS. 2, 4, 5 and 6 show, the external ring 32 is mounted around the lateral wall 35 of the cylindrical body, near the rear open end thereof, and is placed in axial abutment, via its corresponding transverse face 55, against an external shoulder 56 provided in the lateral wall 35 of the body. The ring 32 is also kept in axial abutment by a clamping nut 57 (FIG. 5) which is screwed onto a screw thread 58 that terminates the lateral wall of the body until the nut 57 rests against an internal shoulder 59 formed in the wall 60 of the ring.

Arranged in this wall 60 (FIGS. 4 to 6), are two diametrically opposed internal chambers or cavities 61, 62, of arcuate shape, respectively connected with the lateral passages 33, 34 of the body. For that, arcuate openings or slots 63 are formed in the wall 60 of the ring, and into these open the radial orifices 43 provided in the body and communicating with the lateral passages. At the opposite end from the orifices, the cavities 61, 62 communicate with the axial passages 64, 65 of tubular end fittings or couplings 66, 67 intended for the fluidic connection with the distinct relevant chambers 70, 71 of the fluidic control mechanism 22 of the system 20. These two couplings are parallel and diametrically opposite with respect to the axis A.

Furthermore, it is appropriate to ensure correct angular positioning between the external ring, the cylindrical body and the shroud, so that the correct couplings can be joined together without error, and the axial engagement of the couplings and connector of the cover over the desired length with the fixed ones of the supplies derived from the sleeve.

Figure 6:
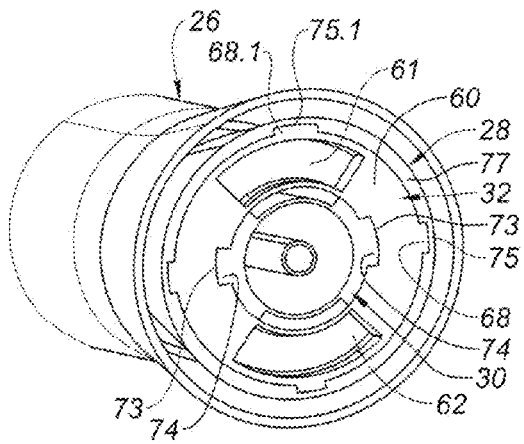
FIG. 6 is an end-on view of the ring and of the rotation-proofing and error-proofing means with the body and the shroud.
Figure 5:
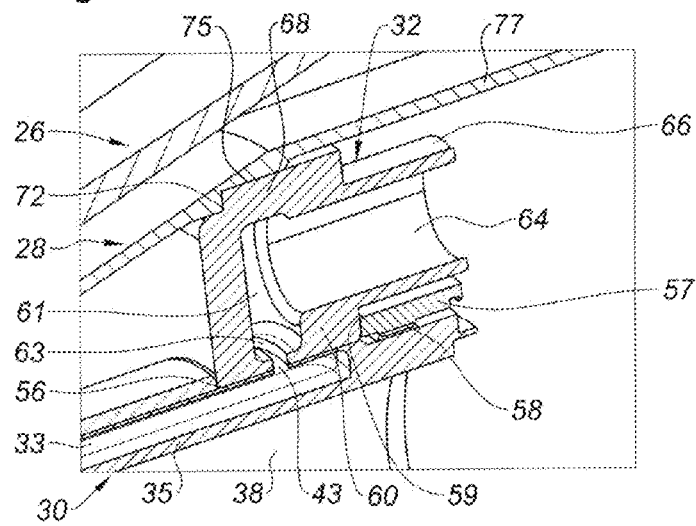
FIG. 5 shows, in partial perspective, the mounting of the external ring on the body of the device and inside a supporting shroud that terminates the sleeve.

To do that, means for providing error-proof rotational connection are provided, as shown particularly in FIG. 6. It may be seen that the means of error-proof connection between the body 30 and the ring 32 is made up of two diametrically opposed sets of groove 73 with lug or rib 74. The grooves 73 are, for example, formed in the interior periphery of the ring 32, while the lugs 74, which are a close fit in the grooves, are provided on the outside of the body. The two sets are also advantageously dimensionally different so that they serve as error-proofing means. Thus, the fitting of the ring 32 around the body 30, which involves rotational connection thereof, can be done only in one single unique angular position for which the lateral passages 33, 34 of the body communicate, via the radial orifices 43, with the corresponding passages 64, 65 of the ring, via the arcuate openings 63 and the chambers 61, 62.

As far as the assembly between the ring 32 and the ring support shroud 28 (FIGS. 5, 6) is concerned, the corresponding error-proof connecting means once again comprises sets of grooves 75 with lug or rib 68, in this example four of these sets, evenly angularly distributed 90° apart.

The lugs 68 project, for example, from the exterior periphery of the wall 60 of the ring 32, and the grooves 75 are on the inside of the cylindrical wall 77 of the shroud 28.

While three of the sets of grooves 75 and lugs 68 are indeed identical, the fourth differs, for example a groove 75.1 and a lug 68.1 which are wider than those of the other sets, in order to clearly indicate the unique position for the angular mounting of the external ring 32 (and, therefore, of the device 27) in the shroud 28, in which position the couplings and connector of the cover are coaxial with those of the hidden supplies.

The grooves 75 in the shroud are also semi-emerging, which means that the bottoms 72 of the grooves constitute an axial end stop for the lugs 68 of the ring which then presses against these, and therefore for the device 27. In this way one can be sure of achieving the appropriate coupling, over the desired length, of the couplings and connector of the cover in the fixed ones of the upstream supplies.

Therefore the external ring 32, in addition to serving to collect and redistribute the oil between the two lateral passages of the body, the two corresponding chambers, the couplings and the control mechanism, via these connecting means, performs a function of positioning the device both axially and in terms of rotation relative to the shroud.

Engaging in a sealed manner into the passages 64, 65 of the couplings 66, 67 are complementary couplings 80, 81 terminating the elbowed entries 82 to the concentric corresponding chambers 70, 71 of the control mechanism 22, which are themselves in connection with the actuator 21. In brief, the chambers 70, 71 are placed in communication with the chamber 21A of the actuator, which chamber is situated upstream of the piston 29. This chamber is supplied via one or other of the chambers 70, 71 depending on the position of the piston 29, reflecting the operating domain (flight/ground) that the airplane is currently in. The tubular element 40 for its part is connected, via another coaxial tubular element 40.1, to the other chamber 21B of the actuator, downstream of the piston. The supply to the chamber 21A via one of the chambers 70, 71 is via an annular cavity 86 between the hollow piston rod 29A and the tubular element 40.1, the rod surrounding the latter.

The cylindrical body 30, the cover 31 and the ring 32 are assembled to constitute the device 27 per se, and the upstream cylindrical part 39 of the control mechanism 22 is introduced into the housing 38 of the body in the direction of the cover 31 until the axial tubular element 40 and the coupling with central passage 36 of the transverse wall 37 of the body come into fitted-together sealed contact. Thereafter, the couplings 80, 81 of the mechanism 22 which are respectively dedicated to the two directions of rotation of the blades are then engaged sealingly into the two couplings 66, 67 of the ring 32.

The device and the mechanism are thus assembled coaxially to constitute a single fluidic assembly or entity. Sliding the front part 39 of the mechanism 22 into the receiving housing 38 of the body 30 over practically the entire length of the latter advantageously makes it possible to minimize axial size and center these two items relative to one another. This part 39 effects a translational movement at the same time as the actuator relative to 70 and, therefore, relative to any static component. FIG. 2 depicts the mechanism in the fully deployed position corresponding to a pitch angle of 90°.

The assembly is then introduced axially into the end shroud 28 of the sleeve 25 already housed inside the annular rotary shaft 26 of the turbine engine, which is intended to rotate the rotor casing 12 of the downstream fan 9, with the actuator 21 and the transmission 23.

During the fitting of the assembly by sliding, the ring 32 is correctly orientated relative to the body 30 and to the shroud 28 by making the lugs 74 of the body and 68, 68.1 of the ring align with the relevant grooves 73 of the ring and 75, 75.1 of the shroud. The device 27 is thus prevented from rotating with respect to the sleeve and in the correct angular position for which the couplings 47, 48, 49 and connector 53 of the cover are aligned facing the complementary couplings and connectors that terminate the hydraulic supplies AL and electrical supplies ALE (FIGS. 8, 9).

By continuing to slide the assembly, the couplings and connector of the cover 31 engage in the complementary ones AL, ALE of the supplies which are fixed relative to the assembly, until such point as the projecting lugs 68 and 68.1 of the ring 32 make axial contact with the bottom 72 of the grooves 75, 75.1 of the shroud 28. This contact marks the position of the coupling device 27 for which the hydraulic and electrical connections are made and guaranteed between the couplings and connectors of the device and of the supplies, through blind displacement of the device, as shown by FIGS. 8 and 9. The couplings of the cover and of the ring all furthermore have inlet chamfers to facilitate engagement with the complementary couplings.

Figure 8:
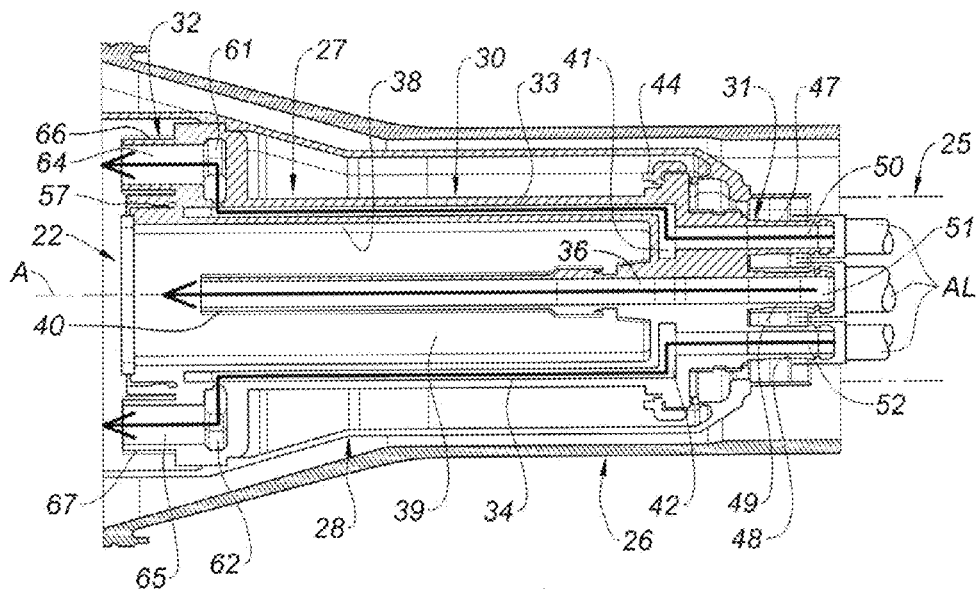
FIGS. 8 and 9 are views in axial section of the device, the section passing through the fluidic couplings and the electrical connector respectively.

The three hydraulic connections are symbolized by thick arrows in FIG. 8, whereas in FIG. 9, one of the electrical connections L runs along the device 27 between the connector 53 (then connected to the connector ALE) and the opposite connector 53.1 already connected to a complementary connector of the relevant sensor CP of the shaft, the other electrical connection being depicted in part.

In order to maintain the axial positioning of the coupling device 27 and the fluidic control mechanism 22 with the actuator 21 of the system 20 relative to the sleeve 25 and guarantee the above connections, a clamping flange 83 is provided, as shown by FIG. 2. This flange 83 is mounted on the external periphery of the cylindrical body 85 of the mechanism 22, projecting from the shroud, and presses against a radial external rim 84 terminating the shroud. The flange is attached to this rim by a fixing nut, not depicted. If the clamping flange 83 cannot come into contact with the rim 84 of the shroud, that means that the device 27 is not correctly "fitted into" the shroud (that the lugs 68, 68.1 of the ring 32 are not in axial abutment against the bottoms 72 forming shoulders of the shroud) and that the "cover-supplies" connections are therefore not correctly made.

FIG. 2 shows that the device 27 and the mechanism 28 are almost integrated into the shroud 28, with only the end of the body 85 of the mechanism bearing the flange emerging from the shroud. This additionally closely follows the profile of the device and of the mechanism, enveloping these.

After the assembly (device and mechanism) has been fitted, the rotor casing 12 is put in place. To do that, it surrounds the assembly, to be fixed on one side to the rotary shaft 26 of the turbomachine, in the continuation thereof, and to collaborate on the other side with the mobile part 24 of the actuator.

The operation of the hydraulic control mechanism 22 in itself, which does not form part of the present invention, will not be described further here. It will briefly be recalled that the desired pitch of the blades of the downstream fan is obtained, by the control 22 and transmission 23 mechanisms of the system 20, for the various phases of flight, on the ground, and in reverse, by supplying oil to the upstream chamber 21A of the actuator from one of the chambers 70, 71 of the mechanism 22 (supplied by the device 27), via the annular cavity 86 depending on the desired direction or pitch orientation and, for feathering, by supplying oil to the downstream chamber 21B from the central channel 40.2 defined by the tubular elements 40, 40.1.

From a manufacturing standpoint, the ring 32 can be produced in two different ways:
  either by conventional molding and machining of two parts (front and rear), by machining hydraulic cavities and fitting a flat seal to provide sealing between these two cavities. The two parts can be assembled by the clamping nut which keeps the entire ring secured to the main body;
  or as one piece, the geometry of the ring then having to be adapted in order to achieve the passage of oil through two holes of adequate different diameter per type of piping;
  or directly by laser sintering.

As far as the main cylindrical body 30 is concerned, this may be produced as a casting using casting inserts at the location of the piping and cavities, with subsequent removal of the inserts, grinding of the functional surfaces and machining of the oil passage holes.

As for the cover 31, this is obtained from a rough form of approximate shape and by machining the functional surfaces.

The present coupling device 27 thus allows a fluidic control mechanism 22 requiring numerous connections, notably hydraulic connections, which are demanding in terms of installation space, to be integrated into a complex and confined environment.

The device therefore achieves its objectives allowing, via its internal accommodating housing, the adaptation of the control mechanism thus reducing the bulk thereof, and via the compact cylindrical shape thereof, integration into the static sleeve and blind coupling to the supplies directly therein, without the need to resort to independent piping and pipework that is difficult to fit.

The device 27 thus acts as a coupling interface or adapter by placing the hidden supplies in communication with the corresponding connections of the fluidic control mechanism and by contributing to saving space in comparison with a conventional network of pipework with couplings and connections to electrical connectors, making it possible to configure hydraulic and electrical auxiliaries in a restricted space which could not otherwise have been assembled.

In another embodiment which has not been depicted, the coupling device could be integrated directly into the mechanism in order to form therewith a fluidic assembly which is no longer assemblable and separable, but a one-piece or unit assembly which both controls the pitch and provides the coupling to the supplies and which can be installed in a particularly confined space.

The invention claimed is:

1. A device for the blind coupling of fluidic, electrical or similar supplies to a receiving control mechanism for a pitch control system for a turbomachine fan, said supplies being situated inside a cylindrical sleeve, and said mechanism outside the cylindrical sleeve along an axis thereof, wherein the device is able to be housed coaxially inside the cylindrical sleeve and comprises:
   a hollow cylindrical body designed to fit inside the cylindrical sleeve and accept the mechanism in a housing of the hollow cylindrical body, and having passages for respectively connecting the supplies to the control mechanism;
   a cover which is integrated or fixed, removably, on a front side of the hollow cylindrical body and designed to connect the supplies to the respective passages of the hollow cylindrical body; and
   a ring for collecting and distributing provided on a rear side of the hollow cylindrical body, around the hollow cylindrical body, and designed to connect the respective passages of the hollow cylindrical body to the control mechanism and to position the hollow cylindrical body, in axial abutment and in terms of rotation, relative to the cylindrical sleeve.

2. The device as claimed in claim 1, wherein the hollow cylindrical body comprises at least two lateral passages formed in a lateral wall of the hollow cylindrical body and opening respectively, at the front of the hollow cylindrical body, into distinct cavities in communication with couplings of the cover, and at the rear, into radial communication orifices of the hollow cylindrical body facing and in communication with couplings of the ring.

3. The device as claimed in claim 2, wherein, in addition to the lateral passages, the hollow cylindrical body comprises an axial passage formed in a transverse wall of the hollow cylindrical body and opening, at the front, into a coupling of the cover and receiving, at the rear, inside the housing of the hollow cylindrical body, a tubular element for connection to the control mechanism.

4. The device as claimed in claim 1, wherein the cover comprises fluidic couplings and at least one electrical or similar connector being parallel to the hollow cylindrical body, able to engage coaxially with sealing and respectively with complementary receiving couplings and a complementary receiving connector which terminate the supplies secured to the cylindrical sleeve.

5. The device as claimed in claim 1, wherein the cover is fixed by screwing to the hollow cylindrical body using a clamping nut mounted around the hollow cylindrical body, and wherein a clamping piece is mounted around the control mechanism and able to press against a free end of the cylindrical sleeve and maintain axial positioning of the device connected to the various supplies of the cylindrical sleeve and to the mechanism.

6. The device as claimed in claim 1, wherein the ring comprises distinct internal cavities in connection with the passages of the hollow cylindrical body via holes made in an internal lateral wall of the ring, and with external fluidic couplings with which complementary couplings originating from the control mechanism can engage.

7. The device as claimed in claim 6, wherein the ring is mounted in axial abutment on the hollow cylindrical body and is fixed thereto by a clamping nut, at an opposite end from a stop, and a rotational-connection and error-proofing means is provided between the ring and the hollow cylindrical body to immobilize the ring and the hollow cylindrical body in terms of rotation in a unique position for which the cavities of the ring communicate with the passages of the hollow cylindrical body.

8. The device as claimed in claim 6, wherein the ring is mounted in axial abutment inside the cylindrical sleeve, after introduction of the device, by a rotational-connection and error-proofing means provided between the ring and the cylindrical sleeve to connect the ring and the cylindrical sleeve in terms of rotation in a unique position.

9. The device as claimed in claim 1, wherein the hollow cylindrical body, the cover and the ring are produced by at least one of molding, machining, and laser sintering.

10. A fluidic assembly for connection between fluidic, electrical or similar supplies situated inside a cylindrical sleeve and a receiving system, said assembly comprising:
    a receiver control mechanism connected to the system; and
    a coupling device as claimed in claim 1, for coupling the supplies and the mechanism.

11. The assembly as claimed in claim 10, wherein the coupling device and the control mechanism are made as one piece.

12. A system for controlling the pitch of the blades of a turbomachine fan comprising:
    a receiving control mechanism based on an actuator;
    a transmission mechanism for transmitting movement between the actuator and the blades;
    fluidic, electrical or similar supplies situated inside a cylindrical sleeve; and
    a device for the blind coupling of said supplies to said control mechanism, said device being as claimed in claim 1.

* * * * *